United States Patent [19]

Rock

[11] 3,812,923
[45] May 28, 1974

[54] WEIGHT DISPLAY SYSTEM AND METHOD

[75] Inventor: Frank C. Rock, Santa Rosa, Calif.

[73] Assignee: National Controls, Inc., Santa Rosa, Calif.

[22] Filed: July 20, 1972

[21] Appl. No.: 273,415

[52] U.S. Cl................. 177/1, 177/165, 177/DIG. 3
[51] Int. Cl............................................. G01g 23/14
[58] Field of Search.......... 177/1, 3, 6, 165, DIG. 3, 177/25

[56] References Cited
UNITED STATES PATENTS
2,974,863   3/1961   Williams, Jr. et al........... 177/165 X
3,262,639   7/1966   Karp................................... 177/3 X
3,740,536   6/1973   Takahashi......................... 177/25 X Primary Examiner—George H. Miller, Jr.
Attorney, Agent, or Firm—Flehr, Hohbach, Test, Albritton & Herbert

[57] ABSTRACT

System and method for displaying gross weight or net weight, as desired. Net Weight is determined by preloading the tare weight into an up/down counter which counts a digital signal corresponding to the gross weight of a load. Initially the counter counts down toward zero, and upon reaching zero it counts up until the count is completed. If the count is completed before the counter reaches zero, a minus sign is displayed with the count.

13 Claims, 2 Drawing Figures

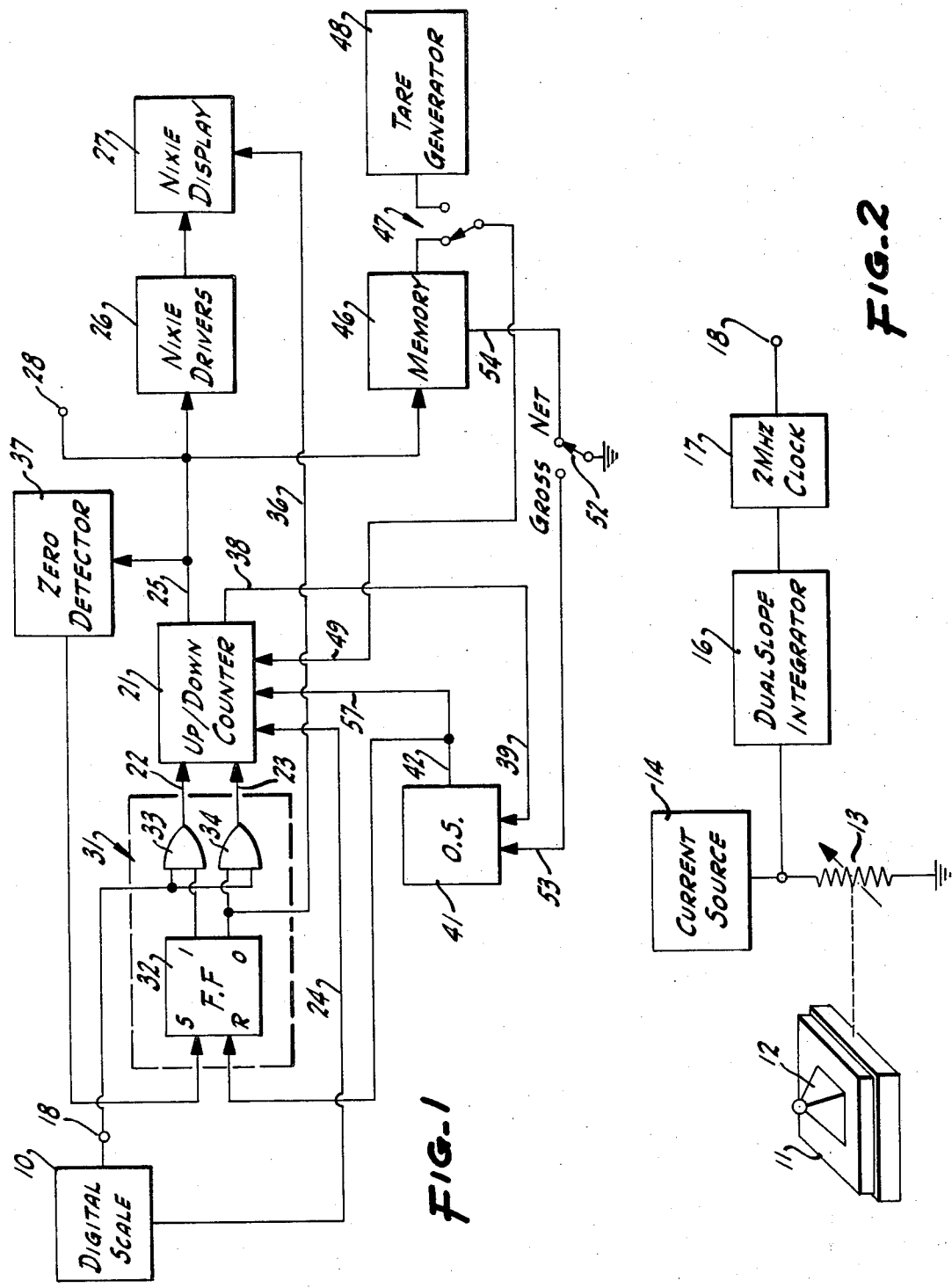

WEIGHT DISPLAY SYSTEM AND METHOD

BACKGROUND OF THE INVENTION

This invention pertains generally to scales and more particularly scales of the type having a digital weight display.

One example of a scale with digital weight display is found in U.S. Letters Pat. No. 3,666,032, issued May 30, 1972 to the assignee herein. In this scale, the weight of a load is initially translated to an analog voltage by means of a resistive load cell coupled to the lever system of the scale. The voltage is converted to a digital signal which is counted and displayed to indicate the weight of the load.

At times it is desirable to know the net weight of a load rather than the gross weight. The net weight can generally be determined by subtracting the tare weight from the gross weight if the tare weight is known. Heretofore, there have been some attempts to provide a digital scale which subtracts the tare weight from the digital signal before it is displayed. These attempts have not produced satisfactory results, and they generally work for weight changes in one direction only.

SUMMARY AND OBJECTS OF THE INVENTION

The present invention provides a system and method for displaying either gross weight or net weight, as desired. It is capable of displaying net weight changes in either direction from any desired reference point or tare weight. To determine net weight, the tare weight is preset into an up/down counter, and the counter is put into its down counting mode. When the load signal is applied to the counter, it first counts down to zero, then switches to its up counting mode and completes the count. If the count should be completed before the counter reaches zero, a minus sign is displayed. Operation of the system is controlled by a pushbutton switch which can cause the weight on the scale at any desired time to be stored and loaded into the counter as the tare weight.

It is in general an object of the present invention to provide a new and improved system and method for displaying weight.

Another object of the invention is to provide a system and method of the above character which is capable of displaying either gross weight or net weight.

Another object of the invention is to provide a system and method of the above character capable of displaying either increases or decreases in net weight.

Another object of the invention is to provide a system and method of the above character in which the mode of operation is controlled by a pushbutton switch.

Additional objects and features of the invention will be apparent from the following description in which the preferred embodiment is set forth in detail in conjunction with the accompanying drawing.

BRIEF DESCRIPTION OF THE DRAWING

FIG. 1 is a block diagram of one embodiment of a weight display system incorporating the present invention.

FIG. 2 is a block diagram of a portion of a digital scale with which the weight display system of FIG. 1 can be utilized.

DESCRIPTION OF THE PREFERRED EMBODIMENT

In the drawing, the weight display system is illustrated in connection with a digital scale 10. This scale includes a platform or base section 11 for receiving a load 12 which is to be weighed. A resistive load cell 13 is coupled to the lever system of the scale, and a current source 14 cooperates with the load cell to produce an analog voltage corresponding to the weight of the load on the scale. The analog voltage is converted to a digital load signal by means of an analog to digital converter of the dual slope or double integration type commonly used in digital volt meters. This converter includes an integrator 16 and a clock 17 which operates at a constant rate, preferably on the order of 2 MHz. The integrator includes a capacitor which is charged by the analog voltage for a predetermined period of time during a first portion of each counting cycle, the level of the voltage on the capacitor at the end of the charging period depending upon the level of the analog voltage. During a second portion of each counting cycle, the capacitor is discharged at a fixed rate, and the duration of this portion depends upon the level to which the capacitor was charged during the first portion of the cycle. The number of pulses generated by clock 17 during the second portion of the cycle thus corresponds to the level of the analog voltage and to the weight of the load. This digital load signal is delivered to a terminal 18.

The weight display system includes an up/down counter 21 having an up-counting input 22 and a down-counting input 23. Pulses applied to the up-counting input cause the counter to advance in the upward or positive direction, and pulses applied to the down-counting input cause it to advance in a downward or negative direction. The counter receives a reset input on a reset line 24 from scale 10. This input is arranged in such manner that the counter is reset to a level differing from the capacity of the counter by an amount corresponding to the number of pulses generated by clock 17 during the first portion of the counting cycle. For example, if the capacity of the counter is 9999 and the clock generates one thousand pulses during the first portion of the cycle, the counter would be reset to 9000.

The output 25 of counter 21 is connected to nixie drivers 26 which, in turn, are connected for driving a plurality of nixie tubes 27 to provide a digital display of the count registered by the counter. If the scale with which the display system is utilized includes nixie drivers and nixie tubes, they can be utilized as elements 26 and 27. An output terminal 28 is also connected to the output of counter 21 and provides a binary coded decimal signal corresponding to the count in the counter. This signal can be recorded or otherwise utilized as desired. If desired, the nixie drivers and nixie tubes can be replaced with another suitable type of display, such as a seven-segment display.

Pulses from clock 17 are applied to counter 21 through a count control circuit 31. This circuit comprises a flip flop 32 and a pair of AND gates 33 and 34. The outputs of the gates are connected respectively to the up and down-counting inputs of the counter, and each gate has one input connected directly to clock input terminal 18. The gates also have second or control inputs which are connected respectively to the 1 and 0 outputs of flip flop 32. Thus, it will be observed that the clock pulses are applied to the up or down-counting inputs of the counter according to the state of flip flop 32. When the pulses are applied to the up-counting input, the counter is said to be in its up-counting mode, and when the pulses are applied to the down-counting input, it is in its down-counting mode. A line 36 is connected between the 0 output of flip flop 32 and nixie diplay 27 for displaying a minus sign in association with the count when the counter is in its down-counting mode.

The output of counter 21 is also connected to the input of a zero detector 37. The output of this detector is connected to the set input of flip flop 32. The overflow output 38 of counter 21 is connected to the trigger input 39 of a one-shot multivibrator 41. The output 42 of this multivibrator is connected to the reset input of flip flop 32.

The output 25 of counter 21 is also connected to the input of a storage register or memory 46. A tare generator 48 provides means for generating a digital signal corresponding to any desired tare weight. A switch 47 provides means for connecting the output of either the storage register or the tare generator to a preset input 49 of counter 21. The output of one-shot multivibrator 41 is connected to a transfer input 57 of the counter and controls the transfer of the count at input 49 to the counter.

A manually operable switch 52 determines whether the system displays the gross weight or the net weight of the load on the scale. One terminal of the switch is connected to an inhibiting input 53 of one-shot multivibrator 41, and a second terminal is connected to a control input 54 of storage register 46. In the preferred embodiment, switch 52 is a pushbutton switch having a spring loaded contact arm biased toward the terminal connected to the storage register control input. With the switch in this position, the net weight of the load is displayed.

Operation and use of the weight display system, and therein the method of the invention can now be described. Initially, let it be assumed that switch 52 is in its depressed or gross weight position. In this situation, the operation of one-shot multivibrator 41 is inhibited, counter 21 remains in its upcounting mode, and the count at preset input 49 is not transferred into the counter. At the outset of each counting cycle, the counter is reset to its initial level by the reset signal from scale 10. During the first portion of the cycle, the counter advances in an upward direction until an overflow occurs. Since the one-shot multivibrator is inhibited, the counter remains in its upcounting mode, and the clock pulses generated during the second portion of the counting cycle are applied to the upcounting input. At the end of the cycle, the nixie tubes display the count registered in the counter, and this is the gross weight of the load on the scale.

When switch 52 is released or in its net weight position, the net weight of the load is displayed. As the switch is released, the count then registered in counter 21 is locked in storage register or memory 46. With switch 47 in the position shown, this count is applied to counter preset input 49. During the first portion of the cycle, the operation of the system is the same as when switch 52 is depressed. However, at the end of this portion of the cycle, that is when an overflow occurs, one-shot multivibrator 41 fires, resetting flip flop 32 and loading the count at input 49 into the counter. Now during the second portion of the cycle, the pulses from the clock are applied to down-counting input 23, and the counter advances in the downward direction. When the count reaches 0000, the zero detector fires, setting flip flop 32. The remaining pulses are applied to the up-counting input and counted in the upward direction. The count displayed by the nixie tubes end of the cycle corresponds to the net change in the weight of the load. If all of the pulses are counted before the counter reaches 0000 while counting downward, the zero detector does not fire, flip flop 32 remains in its reset condition and a minus sign is displayed with the count by the nixie tubes. Thus, the weight displayed is the net change in the weight of the load, whether that change is positive, negative or zero.

It is apparent from the foregoing that a new and improved weight display system and method have been provided. While only the presently preferred embodiment has been described herein, as will be apparent to those familiar with the art, certain changes and modifications can be made without departing from the scope of the invention as defined by the invention as defined by the following claims.

I claim:

1. In a system for displaying the net weight of a load on a scale from a digital signal representative of the gross weight of the load, bidirectional counting means comprising a counter having an up counting input and a down counting input and gating means for steering the load signal to the counter inputs, means for storing a predetermined count in digital form, means for transferring the stored count to the counting means and conditioning the gating means to apply the load signal to the down counting input at the beginning of a counting period, and means responsive to the count in the counter for conditioning the gating means to apply the load signal to the up counting input when the count reaches a predetermined level.

2. A system as in claim 1 together with manually operable means for inhibiting the transfer of the stored count to the counting means and applying the load signal to the up counting input at the beginning of the counting period.

3. A system as in claim 1 further including bistable logic means having first and second outputs for delivering control signals to the gating means.

4. A system as in claim 1 wherein the means for storing a predetermined count includes a storage register connected to the counter for storing the count registered therein at a predetermined time.

5. A system as in claim 1 wherein the means for storing a predetermined count includes means for generating a digital signal corresponding to said count.

6. A system as in claim 1 wherein the means responsive to the count includes a zero detector.

7. In a system for displaying the net weight of a load on a scale from a digital signal representative of the gross weight of the load, a bidirectional counter having up and down counting inputs, memory means connected to the output of the counter, manually operable switch means for locking the count from the counter in the storage means, gating means having first and second outputs connected respectively to the up and down counting inputs of the counter, said gating means also having a load signal input and a pair of control inputs, a bistable flip-flop having first and second outputs connected to the control inputs of the gating means, a one-shot multivibrator having a trigger input connected to an overflow output on the counter and an output connected to one input of the flip-flop, the output of said multivibrator also being connected to the counter for causing the count stored in the memory to be transferred to said counter, and a zero detector having an input connected to the counter and an output connected to an input of the flip-flop, said flip-flop and gating means being arranged in such manner that the load signal is applied to the down counting input in response to a signal from the multivibrator and to the up counting input in response to a signal from the zero detector.

8. A system as in claim 7 wherein said switching means is adapted for inhibiting the operation of the one-shot multivibrator.

9. In a method for displaying the net weight of a load on a scale from an analog signal corresponding to the gross weight of the load, the steps of: converting the analog signal to a digital signal by operating a clock at a predetermined rate, charging a capacitor at a rate corresponding the magnitude of the analog signal for a predetermined period of time during the first portion of a cycle, discharging the capacitor at a predetermined rate during a second portion of the cycle, and utilizing the pulses produced by the clock while the capacitor is discharging as the load signal; storing in digital form a count representative of tare weight; resetting the counter at the start of the first portion of the cycle to an initial level less than the capacity of the counter by an amount corresponding to the number of pulses generated by the clock during the first portion of the cycle; advancing the counter is an upward direction until an overflow occurs; setting the counter at the start of the second portion of the counting period to a count corresponding to the stored count; and counting the load signal into the counter during the second portion of the cycle by first advancing the counter in a downward direction from the level of the stored count toward zero and thereafter advancing the counter in an upward direction.

10. In a system for displaying the net weight of a load on a scale from a digital signal representative of the gross weight of the load, bidirectional counting means for counting the load signal, said counting means having an up counting mode and a down counting mode, means for storing a predetermined count in digital form, means including a one-shot multivibrator having a trigger input connected to the overflow output of the counting means for transferring the stored count to the counting means and setting the counting means in its down counting mode, and means responsive to the count in the counting means for switching the counting means to its up counting mode when the count reaches a predetermined level.

11. In a system for determining changes in the weight of a load on a scale from a digital signal representative of the gross weight of the load, bidirectional counting means having an up counting mode in which the count in the counting means advances in an upward direction in response to an input signal and a down counting mode in which the count advances in a downward direction in response to an input signal, means for applying the load signal to the counting means as an input signal, memory means for storing the count registered by the counting means at a desired time, means for transferring the stored count from the memory means to the counting means and setting the counting means in its down counting mode at the beginning of a counting period, means responsive to the count in the counting means for switching the counting means to its up counting mode when it has counted down to zero, and manually operable switch means for conditioning the memory means to store the count registered by the counting means at the time the switch means is actuated whereby the count registered by the counting means at the end of the counting period corresponds to the net change in the weight of the load from the time the switch means is actuated.

12. A system as in claim 11 further including means for displaying the count in the counting means at the end of a counting period and means for displaying a minus sign with the count in the event that the counting means is still in its down counting mode at the end of the counting period.

13. A system as in claim 11 wherein the switch means comprises a pushbutton switch which when depressed inhibits the transfer of the stored count to the counting means and inhibits the setting of the counting means in its down counting mode whereby the counting means registers a count corresponding to the gross weight of the load as long as the switch is depressed, the count being stored in the memory means when the depressed switch is released.

* * * * *